United States Patent

Armstrong

[11] 3,934,231
[45] Jan. 20, 1976

[54] ADAPTIVE BOOLEAN LOGIC ELEMENT

[75] Inventor: William Ward Armstrong, Montreal, Canada

[73] Assignee: Dendronic Decisions Limited, Montreal, Canada

[22] Filed: Feb. 28, 1974

[21] Appl. No.: 446,968

[52] U.S. Cl. .............................. 340/172.5
[51] Int. Cl.² .............................. G06F 15/18
[58] Field of Search ....................... 340/172.5

[56] References Cited
UNITED STATES PATENTS

| | | | |
|---|---|---|---|
| 3,262,101 | 7/1966 | Halpern | 340/172.5 |
| 3,327,291 | 6/1967 | Lee | 340/172.5 |
| 3,613,084 | 10/1971 | Armstrong | 340/172.5 |
| 3,638,196 | 1/1972 | Nishiyama et al. | 340/172.5 |
| 3,702,986 | 11/1972 | Taylor et al. | 340/172.5 |
| 3,725,875 | 4/1973 | Choate et al. | 340/172.5 |

Primary Examiner—Malcolm A. Morrison
Assistant Examiner—Jerry Smith
Attorney, Agent, or Firm—Alan Swabey; Robert E. Mitchell

[57] ABSTRACT

A digital logic circuit, hereinafter referred to as an element, of which an interconnected plurality together with their connections to a control unit comprise a learning machine which synthesizes a boolean function of n variables as the result of a training procedure.

Each element may operate as a two-input, one-input combinational circuit of one of four logical types, where the type is determined by the current internal state of the element. All four types are such that a (ZERO,ZERO) input pair gives rise to a ZERO output, and a (ONE,ONE) input pair gives rise to a ONE output, while the particular operation realized is determined by two function value units which compute suitable outputs under the (ONE,ZERO) and (ZERO,ONE) input pairs to the element.

Three different species of element are described differing in their computation of heuristic responsibility. The "global search" species is useful when the function to be synthesized is not constant; there is a convergence theorem related to this species. The "latest error" species is also useful for applications where the function to be synthesized may be a constant; but this type does not obey a known convergence theorem. The "hill climbing" species is useful principally to improve an existing approximate synthesis.

Means are provided for setting and reading out the functions realized by the elements in a tree-like network in order to facilitate storage and transmission of synthesized functions.

10 Claims, 11 Drawing Figures

HEURISTIC RESPONSIBILITY UNIT ("GLOBAL SEARCH")

HEURISTIC RESPONSIBILITY UNIT ("LATEST ERROR")

ADAPTIVE BOOLEAN LOGIC ELEMENT

BACKGROUND OF THE INVENTION

Given the number $n$, a network of elements made according to the present invention with appropriate connections to $n$ logical signals and their complements could, in theory, be constructed in such a way that any one of the $2^{2^n}$ boolean functions of $n$ variables would be attained for at least one state. The resulting machine would thus be a universal function-learner for $n$ variables. However, the synthesis of any desired boolean function of $n$ variables by a universal function-learner can already be accomplished by the Generalized Self-Synthesizer of P. H. Halpern, U.S. Pat. No. 3,262,101 issued July 19, 1966. For this task, then, the present invention, although applicable, provides no improvement in principle. Furthermore, if the number of variables $n$ is very large, in the hundreds or thousands, any universal function synthesizer whatsoever, including of course one made according to the present invention or Halpern's, is physically impossible to build, due to the great number of states and therefore parts (at least $2^n$) required.

Fortunately, many useful functions of a large number $n$ of variables are of very low sensitivity compared to most boolean functions of $n$ variables. Sensitivity of a boolean function $f$ can be precisely defined by a modulus of sensitivity function $\mu_f$ which for an interger $d \geq 0$ has a value $\mu_f(d)$ equal to the probability that $f(a)$ is not equal to $f(b)$ under the condition that $a$ and $b$ vary over all $n$-tuples which differ in precisely $d$ components. The probabilities are calculated with respect to some probability distribution P given on the set of all $n$-tuples. Explicitly: $\mu_f(d)$ is equal to the sum of $P(a)P(b)$ over all pairs $(a, b)$ such that $a$ and $b$ differ in precisely d components and such that $f(a)$ is not equal to $f(b)$, divided by the sum of $P(a)P(b)$ over all pairs $(a, b)$ such that $a$ and $b$ differ in precisely $d$ components; $\mu_f(d)$ is undefined if the latter sum is zero. A function $f$ for which $\mu_f(d)$ is "small" when $d$ is "small" will be called "insensitive" or "of low sensitivity". An example of an insensitive function is obtained by considering the classification of handwritten numerals represented by $n = 144$ logical values in a 12 × 12 array into two classes, say the "six" class and the "non-six" class. A few values changing in the array will not usually change the correct classification of a character. A theoretical treatment of sensitivity is to be found in the following paper, but it is not entirely adequate for the purposes of the present invention: G. V. Bochmann and W. W. Armstrong: Properties of boolean functions with a tree decomposition, BIT 14 (1974), pp. 1–13.

For the synthesis of insensitive functions of many variables, machines of a different nature than Halpern's are required. Previous devices which have been proposed, or could be used, include the well-known Perceptron of F. Rosenblatt (see M. Minsky, S. Papert: Perceptrons. An introduction to computational geometry. M.I.T. Press, 1969), the networks of Artrons of R. J. Lee, U.S. Pat. No. 3,327,291 issued June 20, 1967, the Slam networks of I. Aleksander (see I. Aleksander: Some psychological properties of digital learning nets. International Journal of Man-Machine Studies 2, 189–212, 1970), and the trainable digital apparatus of W. Armstrong, U.S. Pat. No. 3,613,084 issued Oct. 12, 1971. The present invention has advantages when compared to all of the aforementioned systems.

The central part of a Perceptron, the part wherein leaning occurs, is capable of realizing a certain class of so-called linearly separable functions, and there exists a Perceptron convergence theorem which states that certain training algorithms will lead to a state in which the output signal is always the specified response to the input signals. A fundamental difficulty with the Perceptron system is that the class of linearly separable functions of $n$ variables is extremely small, and the power of these systems must be augmented by finding task-specific transformations of the data before they are applied to the function-learner. The present invention, however, needs no such external augmentation (except, of course, to convert input signals into $n$-tuples of logical signals), since some machine made according to the present invention could, in principle, synthesize any $n$-variable function whatsoever. The use of several layers of linear-threshold learning devices to attain a larger class of functions has not been very successful up to the present time since no satisfactory training algorithm was known for such networks. The present invention does represent a solution to this problem, though, for a very special kind of linear threshold element.

The present invention has advantages when compared to the adaptive logic networks of Lee, Aleksander, and Armstrong aforementioned. These advantages concern both the capacities of learning and of insensitive extrapolation (generalization). The restriction of the class of boolean functions of two variables realizable by the elements of a binary tree network to precisely the four nonconstant increasing functions of two variables is crucial. These functions are $AND(x,y) = xy$, $OR(x,y) = x+y$, $LEFT(x,y) = x$, and $RIGHT(x,y) = y$. It is the increasing nature of the functions which equates the output signal of an element in the network to the output of the network whenever that element is responsible, i.e. whenever changing its output would change the network output. A convergence theorem states that a synthesis of a specified function will be obtained by means of a certain algorithm for assigning these four functions to nodes of a binary tree provided (a) a synthesis of the function exists and (b) the components of the $n$-tuples are stochastically independent under the distribution P. This theorem is proved in the paper: W. W. Armstrong, G. V. Bochmann: A convergence theorem for logical network adaptation. Publ. No. 95, Départment d'Informatique, Université de Montréal, 1972. The said algorithm is not sufficiently powerful for practical applications, and it is therefore replaced herein by a statistical procedure based on the new concept of "heuristic responsibility" of an element when a certain $n$-tuple is input to the network. The implementation of this concept enables elements of a generally tree-like network to be specialized to the learning of a function which is a restriction of the specified function to a certain subset of $n$-tuples of input signals emanating from the control unit. This specialization generally becomes more pronounced as training progresses and has the effect of permitting efficient use to be made of every part of the given, fixed, network of elements.

The advantage of the present invention in respect to extrapolation comes from the theoretically and practically demonstrable fact that the functions realized by assignments of AND, OR, LEFT, and RIGHT to the elements in a large balanced binary tree are, averaged over the ensemble of all such assignments, extremely insensitive. For example, in such a tree with L layers of elements, the probability of change of the output signal when uniformly distributed input signals are perturbed is upper bounded by $12/(3L+13)$, no matter how many of the $n=2^L$ input signals are inverted ! Training of such a network using a partially specified boolean function of $n$ variables is an attempt to select from said ensemble of assignments one which is in conformity with the constraints imposed by the training data. If far fewer than $2^n$ constraints on function values are imposed, it may be expected that a synthesis so found will yield an insensitive function. Of course, if all $2^n$ function values are specified in training, the possible syntheses all have the modulus of sensitivity of the specified function, which need not be small at all.

A recognition of the importance of insensitivity is lacking in previous inventions of adaptive logic networks, including those of the present inventor. Claims are therein made for greater effectiveness if the elements have an increased number of inputs or are each capable of acting as a universal logic element. Unfortunately, such elements yield more sensitive ensembles of functions and may be useless for extrapolation.

SUMMARY OF THE INVENTION

Accordingly, it is an object of the present invention to provide a new and improved type of synthesizing machine, mainly useful for boolean functions of many variables which are of low sensitivity, but which can also be used, in principle, for synthesizing any boolean function whatsoever.

More specifically, an object of this invention is a generic adaptive boolean logic element, here embodied in three species, useful for interconnection in networks which can be systematically trained by the presentation of a sequence of input logical $n$-tuples, each together with the specified response to that input, to synthesize specified or partially specified boolean functions, or satisfactory approximations thereof.

Another object of this invention is to provide adaptive boolean logic elements which promote rapid computation of network output and rapid adaptation in response to network inputs through the use of parallel computation in generally tree-like networks, and which promote effective and efficient synthesis through the use of two function value unit means to determine which one of four logical operations is realized by the element at any instant and two heuristic responsibility unit means to permit efficient use of all parts of the given network.

Another object of this invention is to provide a means which enables the logical operation of each element of a tree-composition of gates to be set in any specified arrangement, without separate wires from the control unit to each element for this purpose, by a procedure involving the presentation of four input signal patterns to the network for each layer of elements in the tree, while using a particular connection pattern between the control unit and the network.

It is a further object of this invention to provide a procedure for reading out the logical operations realized by all elements using the same means as for setting to enable syntheses to be transferred between identically connected networks or stored for future use.

DESCRIPTION OF THE DRAWING

A complete understanding of the present invention and of the above objects, features, and advantages thereof may be gained from a consideration of the following detailed description of a particular embodiment thereof in connection with the accompanying drawings wherein.

DETAILED DESCRIPTION

Figure 1:
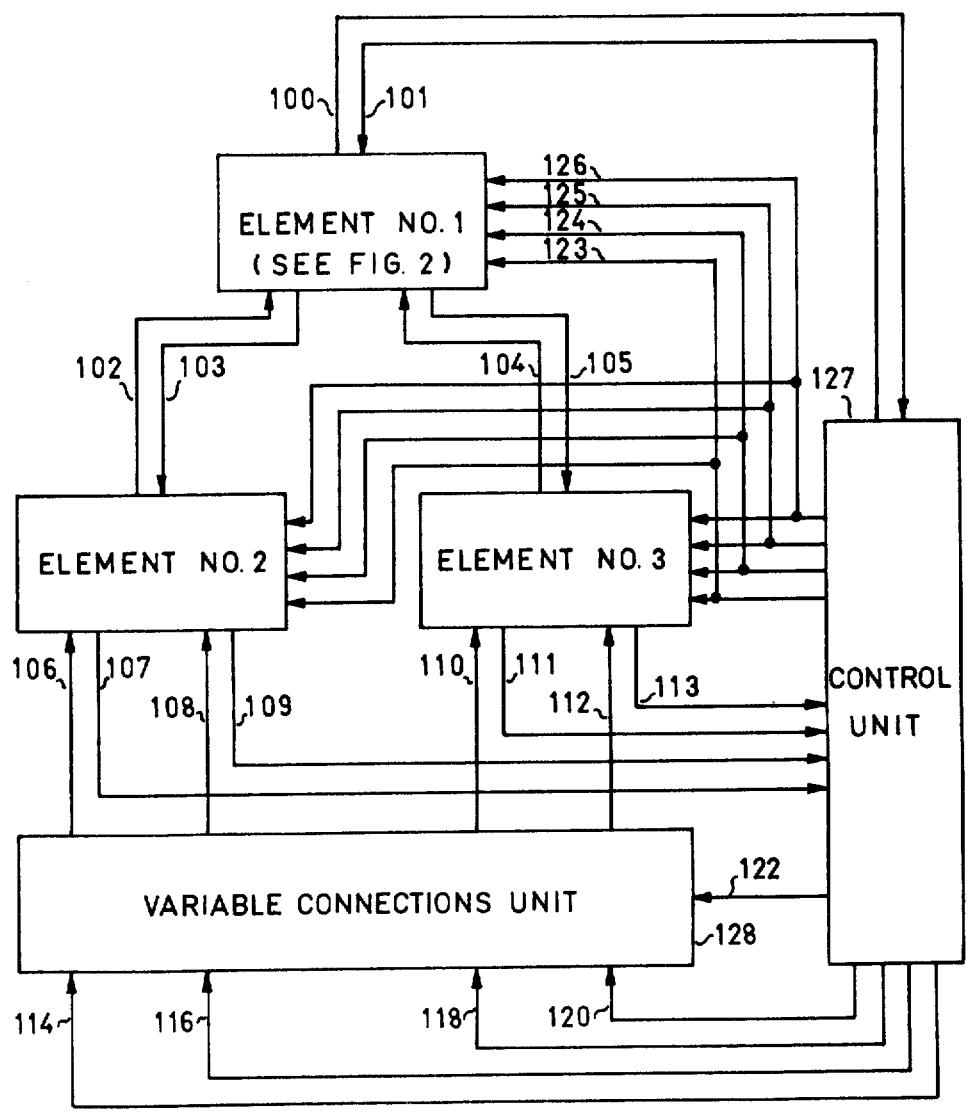
FIG. 1 is a block diagram of a network composed of three elements, a variable connections unit, and a control unit.

An example of a system for training a small three-element network is shown in FIG. 1. It must be remembered that to be useful for synthesizing functions of a large number of variables, there must be many elements, perhaps thousands, in the network, however the structure and the operation of such networks can be conveniently and completely explained using the simple three-element network shown. The elements nos. 1, 2, and 3 are interconnected in the form of an inverted tree. In a larger example, four more elements could be added, with nos. 4 and 5 connected to element no. 2 (in the same manner as 2 and 3 are connected to 1) and with nos. 6 and 7 connected to element no. 3. For still larger systems layers of 8, 16, 32 . . . elements could be added successively. It will be seen below that it is not essential for the operation of this invention that the network be structured as a tree, nor, if it is, that the tree be of one of these balanced forms, where all paths from the network inputs to the root node are of equal depth.

Element no. 1, in a given state, operates as a combinational circuit with two input leads, 102 and 104, and one output lead 100 which also serves as the network output lead. Similarly, as a combinational circuit, element no. 2 has input leads 106 and 108 and output lead 102, and element no. 3 has input leads 110 and 112 and output lead 104. A reference to the "input" or "output" leads of an element will refer only to the above leads. The leads 101, 103, 105, 107, 109, 111, 113 carry heuristic responsibility signals. The leads 123, 124, 125, and 126 transmit signals from the control unit to all elements; they are respectively for the "CLEAR" command, the "PRESET" command, the clock signal, and (during training only) the value of the desired network output for the current input $n$-tuple.

The variable connections unit 128 connects each one of the network input leads 106, 108, 110, and 112 to one of the leads 114, 116, 118, and 120 from the control unit or to the output of an inverter whose input comes from one of the leads 114, 116, 118, or 120. Under control of lead 122 from the control unit, the connection pattern may be changed to any one of a given set of available patterns. The mechanism of this change is not specified, and it is not important for an understanding of the present invention. For setting and read-out of the logical operations of the elements, a one-to-one correspondence is to be used, which connects 106 to 114, 108 to 116, 110 to 118, and 112 to 120. However, in general, leads 114, 116, 118, and 120 may receive zero, one, or several connections from leads 106, 108, 110, and 112, some of them perhaps involving inversions. For example, if the number of variables n of the specified function is 3, then lead 120 would receive no connection. For n=2 leads 118 and 120 would receive no connections, and so on. Generally it is desirable to use connection patterns which have an equal multiplicity of connections to each of the n leads from the control unit, about half of them containing inverters. If n is greater than the number of leads from the network, information may be lost. A larger network solves this problem and enables more functions to be synthesized.

As an example of a variable connections unit, we can choose two connection patterns hereinafter called pattern 0 and pattern 1. Pattern 0 connects lead 106 to lead 114, 108 to 116, 110 to 118, and 112 to 120. It is the effective connection pattern if lead 122 carries a ZERO signal. Pattern 1 connects lead 106 to lead 114, 108 to 116, 110 to 118, and 112 to the output of an inverter whose input lead is connected to lead 114. It is the effective connection pattern if lead 122 carries a ONE signal. In this case the signal on lead 120 is not used. The input vector to the network has only n=3 components, and the system is to synthesize a boolean function of three variables, on leads 114, 116, and 118.

The heuristic responsibility leads 107, 109, 111, and 113 from the lowest layer of elements are connected directly to the control unit. No use will be made of these signals in the present description, however, they might obviously be used in a more elaborate system involving, say, five three-element tree-networks and variable connection units where input signals on leads 106, 108, 110, and 112, which are supposed respectively set equal to the signals on leads 114, 116, 118, 120 by the variable connections unit, could be output signals produced by four other networks. The control unit could transmit the heuristic responsibility signal on lead 107 to the lead analogous to lead 101 of the element of the other tree whose output appears on lead 106. The signals on leads 109, 111, and 113 would be treated similarly, and the effect would be that of a network with 15 elements. By this means a control unit could form networks of variable size and shape from a plurality of networks of fixed size.

There are four modes of operation of the system: training, read-out, setting, and use. A period of training is characterized by the control unit's holding a ONE on lead 101, a ONE on lead 122, and ZERO signals on leads 123 and 124. A sequence of n-tuples is placed on the leads 114, 116, 118, and 120, each one accompanied by the desired network output value on lead 126. While each member of the sequence is being held and after all signals have attained stable values, a clock pulse is given on lead 125. After the pulse, state changes in the elements may have occurred, and the next member of the sequence may be presented, or training may be terminated by placing a ZERO on lead 101.

A period of setting or read-out is characterized by a ZERO on leads 101, 122, 125, 126, and by a sequence of input 4-tuples on leads 114, 116, 118, and 120, each followed, after stabilization of all signals by a short rise to ONE and a return to zero on one of the leads 123 or 124 for a CLEAR or PRESET command respectively. By this means the control unit can determine by reading lead 100 the assignment of functions AND, OR, LEFT, and RIGHT to the elements or it can set all logical operations in any prescribed way, as will be described in detail below.

A period of use is characterized by a ZERO on leads 101, 123, 124, 125, 126, and a ONE on lead 122. A sequence of n-tuples may be presented on leads 114, 116, 118, and 120 each followed by reading the computed value on lead 100. During use, the variable connections unit and the network act as an n-input, one output combinational circuit with a propagation delay roughly proportional to the number of layers of elements.

Figure 2:
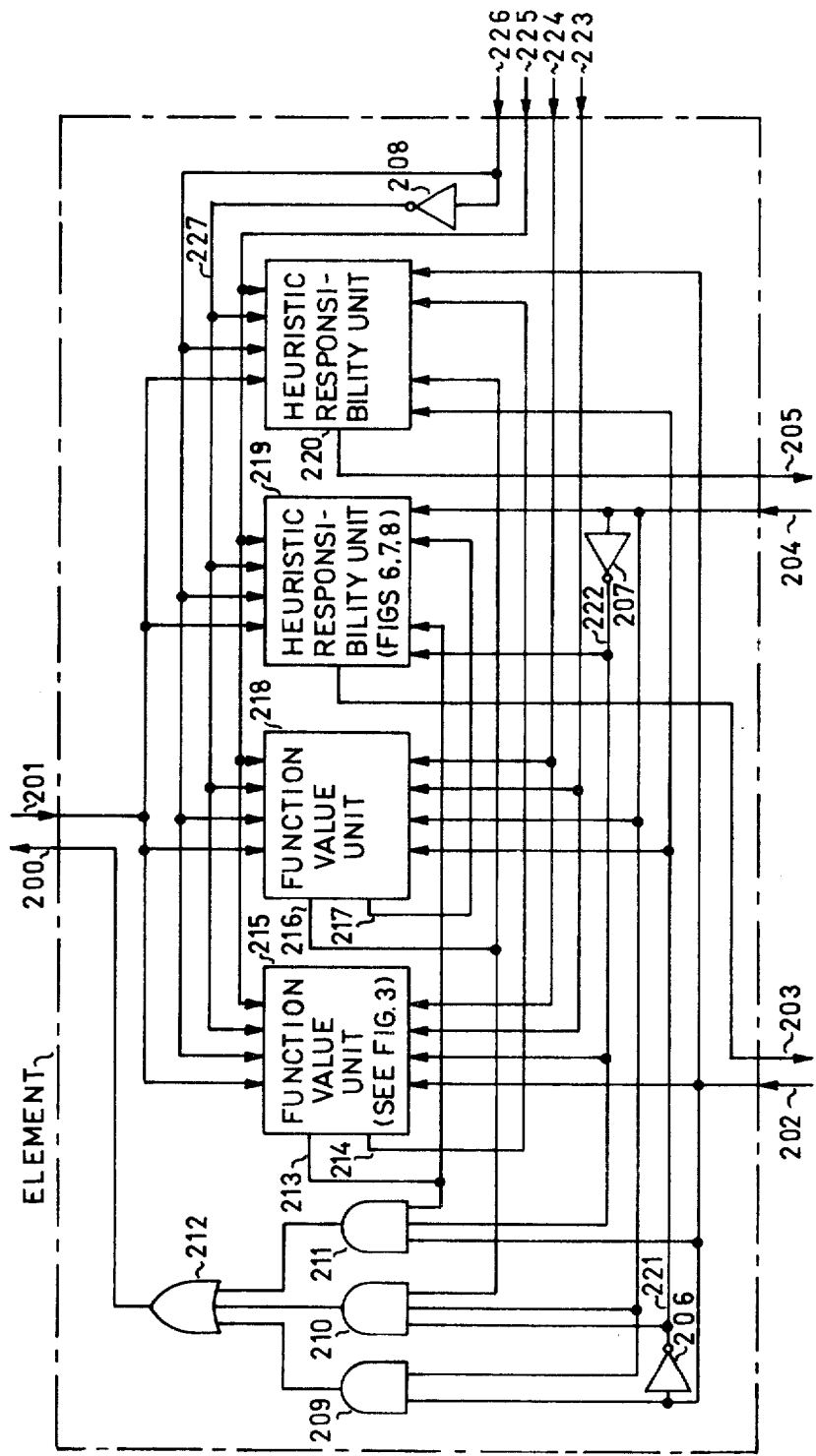
FIG. 2 is a circuit diagram of one element.

Reference is now made to FIG. 2 which shows the circuit of one element of the network of FIG. 1. Lead 202 is the left input, lead 204 the right input, and lead 200 the output when the element is regarded as a two-input, one-output combinational circuit. The logical operation realized at any instant in time is determined by the state of two function value units 215 and 218. The logical signal on lead 213 determines, indeed is equal to, the output on lead 200 when lead 202 carries a ONE and lead 204 carries a ZERO. Lead 214 carries the complement of lead 213. The logical signal on lead 216 similarly determines the element output on lead 200 when lead 202 carries a ZERO and lead 204 carries a ONE. Lead 217 carries the complement of lead 216. If leads 202 and 204 both carry ZEROs, then the output on lead 200 is ZERO; and if leads 202 and 204 both carry ONEs, then the output on lead 200 is ONE. These computations are performed by inverters 206 and 207, AND-gates 209, 210, and 211, and OR-gate 212.

The element can realize any one of four functions of two variables depending upon the signals on leads 213 and 216. If both of these are ONE, the element operates as an OR-gate; if both are ZERO, as an AND-gate. If lead 213 carries a ZERO while lead 216 carries a ONE, the output on lead 200 is equal in value to the right input on lead 204, and the element operates as a RIGHT-gate. If lead 213 carries a ONE and lead 216 a ZERO, the element operates similarly as a LEFT-gate. Thus the signals on leads 213 and 216 are sufficient to characterize the operation of an element during computation of its output. The remaining circuitry of the element is concerned with changes of the logic values on leads 213 and 216 during setting, read-out, or training.

Lead 223 normally carries a ZERO, however, if it is made ONE for a short time interval during setting or read-out, and then returned to ZERO, and if the inputs on leads 202 and 204 are, respectively, ONE and ZERO, then lead 213 will be set to ZERO by function value unit 215. Similarly the signal on lead 216 is set to ZERO if the latter inputs are, respectively, ZERO and ONE. Such a temporary rise to ONE on lead 223 will be referred to as a CLEAR command. A CLEAR command does not change the state of the element if the pair of inputs on leads 202 and 204 is (ONE,ONE) or (ZERO,ZERO).

In a similar manner lead 224 may carry a PRESET command which sets lead 213 or 216 to ONE if the pair of signals on leads 202 and 204 is (ONE,ZERO) or (ZERO,ONE) respectively. The implementation of PRESET and CLEAR commands will be discussed more fully below.

Lead 225 carries the clock signal which is influential only during training. One clock pulse, a change from the normal ZERO signal to a ONE for a short time interval, followed by a return to ZERO, is given after each successive $n$-tuple is presented to the network by the control unit during training.

Lead 226 carries a signal equal to the value specified for the function to be synthesized for the current input $n$-tuple during training. The signal on this lead is influential only during training and may be given a constant ZERO value at other times.

Lead 227 carries the complement of this signal, determined by inverter 208.

The heuristic responsibility units 219 and 220 compute the left and right heuristic responsibility outputs of the element, on leads 203 and 205 respectively. These are influential only during training and carry ZEROs during setting, read-out or use periods. A given element in the network is said to be "heuristically responsible" for a given $n$-tuple presented during training if the signal on its lead 201 is ONE. Heuristic responsibility may be implemented in several different ways, but basically it is always a means for causing certain parts of the network to specialize to producing restrictions of the specified function to certain subsets of $n$-tuples. It is always implemented in such a way that if lead 201 is ZERO, then the outputs on leads 203 and 205 are ZERO and no change of state of the function value units or heuristic responsibility units of the element can occur for the current input $n$-tuple. In this way the control unit can employ the network as a purely combinational circuit by keeping a ZERO on the heuristic responsibility input lead 101 of the output element of the network.

Figure 3:
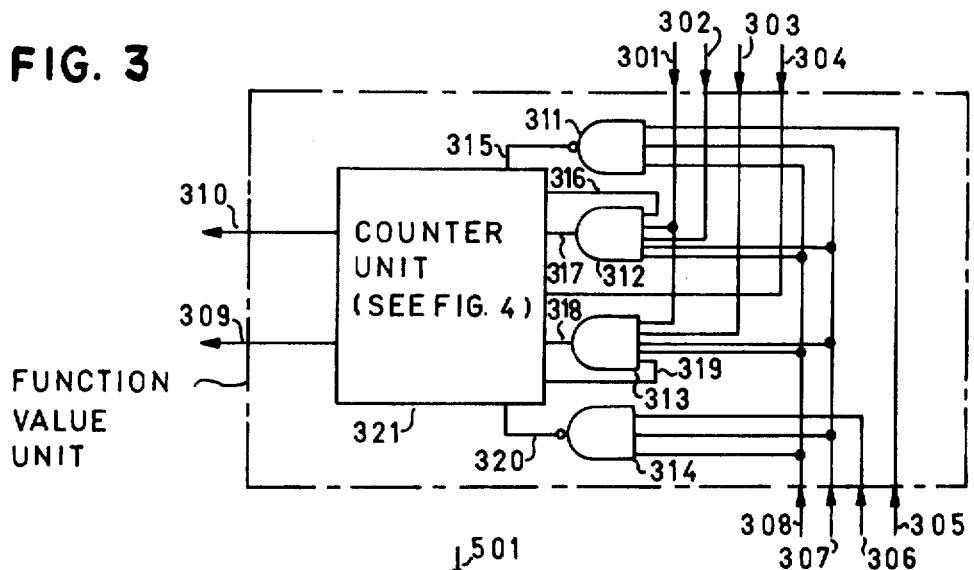
FIG. 3 is a circuit diagram of one function value unit of FIG. 2.

Reference is now made to FIG. 3 which shows one function value unit of the element of FIG. 2. Lead 301 carries the heuristic responsibility input signal from lead 201; lead 302 carries the desired network output from leads 226 and 126; lead 303 carries its complement from lead 227; lead 304 carries the clock signal from leads 225 and 125; lead 305 carries the PRESET signal from leads 224 and 124; and lead 306 carries the CLEAR signal from leads 223 and 123. Leads 307 and 308 carry signals determined as shown in FIG. 2 by the input pair of the element on leads 202 and 204. Function value unit 215 can change state only for the (ONE,ZERO) input pair on leads 202 and 204 (in that order), and function value unit 218 can only change for the (ZERO,ONE) pair. The unit selected is characterized by having ONEs on leads 307 and 308.

The counter unit 321 has a range of consecutive integer values 0,1, . . . MAX, where MAX is a positive integer, chosen for convenience to be a power of two less unity. If MAX equals $2^b-1$ then output lead 310 carries a ONE if the value stored in the counter unit is greater than or equal to $2^{b-1}$ and is ZERO otherwise. This means that the signal on lead 310 is simply the value of the most significant bit of the binary representation of the value stored in the counter unit. Lead 309 outputs the complement of the value of lead 310.

Leads 315 and 320 set the counter unit to MAX or to 0, respectively, when a temporary drop from ONE to ZERO on that lead occurs. Since the control unit never simultaneously sends a PRESET and a CLEAR command on leads 124 and 123, there is no ambiguity possible here. The signal on lead 315 is computed by NAND-gate 311 with inputs from leads 305, 307, and 308; similarly the signal on lead 320 is computed by NAND-gate 314 with inputs from leads 306, 307, and 308.

Lead 316 carries a ONE if and only if the value stored in the counter unit is not equal to MAX; and lead 319 carries a ONE if and only if the value in the counter unit is not 0. If a ONE is present on lead 317 at the beginning of a clock pulse, then the value in the counter at the end of the clock pulse is one greater than before the pulse. In a similar manner a ONE on lead 318 decreases the value by unity. In this description the inhibition of cyclic changes at the limiting values 0 and MAX will be shown externally, although it will always be possible to use a counter unit which does this internally.

There is then a ONE signal on the up-count lead 317 if and only if all the inputs to AND-gate 312 which computes it are ONE. Thus lead 316 must indicate that the counter is not at maximum, lead 301 coming from lead 201 must indicate that the element in question is heuristically responsible, leads 307 and 308 must indicate by ONEs that the function value unit is the one corresponding to the appropriate input pair on leads 202 and 204 of FIG. 2, and finally the desired network output value must be ONE, as indicated by lead 302.

Similarly there is a ONE signal on the down-count lead 318 if there are ONE signals on the inputs to AND-gate 313; on lead 319 indicating that the counter unit value is not 0, on lead 301 indicating that the element is heuristically responsible, on leads 307 and 308 as above, and on lead 303 indicating that the desired network output is ZERO.

Otherwise leads 317 and 318 carry ZEROs and no change of counter unit value can occur. They are never simultaneously ONE due to the complementary values on leads 302 and 303. We recall that changes of counter unit values occur only at clock-pulses, not at the moment when a ONE signal appears on lead 317 or 318.

The task of the function value unit corresponding to a given input pair (ONE,ZERO) or (ZERO,ONE) on leads 202 and 204 is to determine by a simple statistical counting technique whether there are more ONE and ZERO desired network outputs indicated when the given element is heuristically responsible and when a certain input pair on leads 202 and 204 occurs. If there are more ONEs the counter unit will tend to enter and remain in the upper half of its range, where the output on lead 310 is ONE. This is the value transmitted to element output lead 200 under the appropriate input pair on leads 202 and 204. An analogous situation occurs if there are more ZEROs. For the purpose of this statistical analysis, the value of MAX should be at least 15, which is the value chosen here for the preferred embodiment of the invention.

Of course, the description above is overly simple in that the sets of $n$-tuples presented to the network (a) for which the given element is heuristically responsible and (b) for which a certain input pair occurs on leads 202 and 204 are themselves changing with time during training. This is due to changes of the functions of two variables realized by other elements (and to the non-combinational nature of the heuristic responsibility computation during "global-search" or "latest error" training). The insensitivity of binary tree functions probably exerts a stabilizing, conservative influence when functional changes occur, in that the above time-varying sets of $n$-tuples tend to be only "slightly" modified for any one change.

We note that the constant functions of two variables have not been included in the class realizable by any element. They are never required except, perhaps, when the desired network output is itself a constant function, since in any tree synthesis with AND, OR, LEFT, RIGHT, 0, 1 appropriate insertion of LEFT and RIGHT functions and replacement of the constants by, say, AND can achieve an equivalent synthesis. Thus two buts of information from two function value units are all that is required to characterize the logical operation of a satisfactory class of functions.

Figure 4:
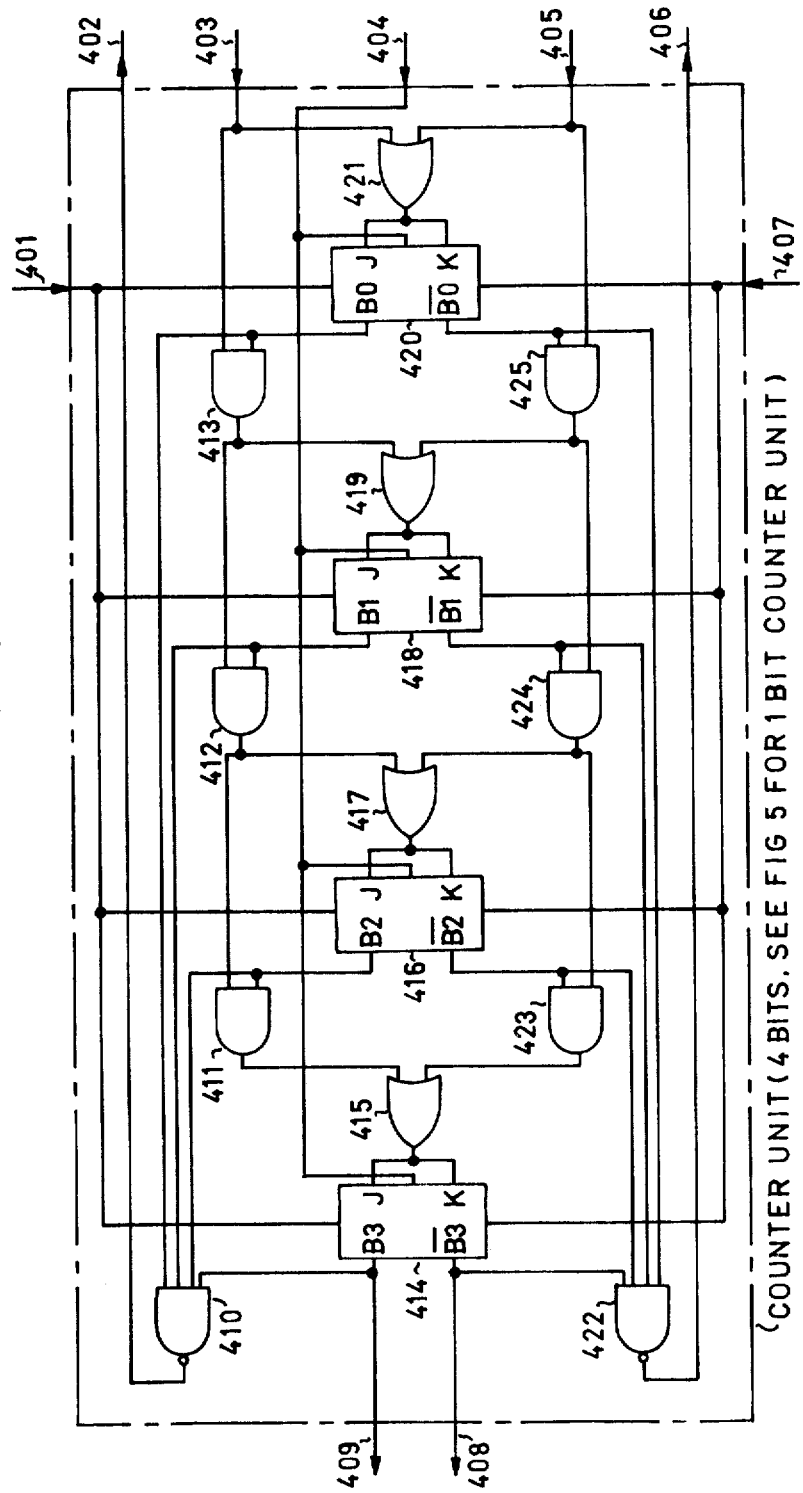
FIG. 4 is a circuit diagram of a counter unit used in FIG. 3, for the case of four bits.

Reference is now made to FIG. 4 which shows the preferred embodiment for the counter unit of FIG. 3. The circuit is well-known, so the description of it can be brief. Four master-slave JK-flip-flops 414, 416, 418, and 420 store the four bits of the value in order of descending significance in the binary notation. To increase the value by unity at the next clock pulse on lead 404, a ONE is placed on up-count lead 403, and through AND-gates 411, 412, and 413, and OR-gates 415, 417, 419, and 421 the flip-flops of bits such that all bits of lesser significance store ONEs receive ONEs on both J and K input leads, causing inversion of that bit at the clock-pulse. For example, 1011 becomes 1100. The "not-at-maximum" lead 402 from NAND-gate 410 inhibits a ONE on lead 403 externally to the counter unit in all applications discussed here when the value stored is 1111. Hence cycling modulo 16 never occurs as this counter unit is employed herein. The down-count lead 405 and the "not-at-zero" lead 406 operate analogously using in addition AND-gates 423, 424, 425 and NAND-gate 422. A temporary drop to ZERO on lead 401 causes a preset of all flip-flops to ONE, while a temporary drop to ZERO on lead 407 causes a clear of all flip-flops to ZERO, independently of the clock signal. The counter unit outputs the value of the most significant bit on lead 409 and its complement on lead 408.

Figure 5:
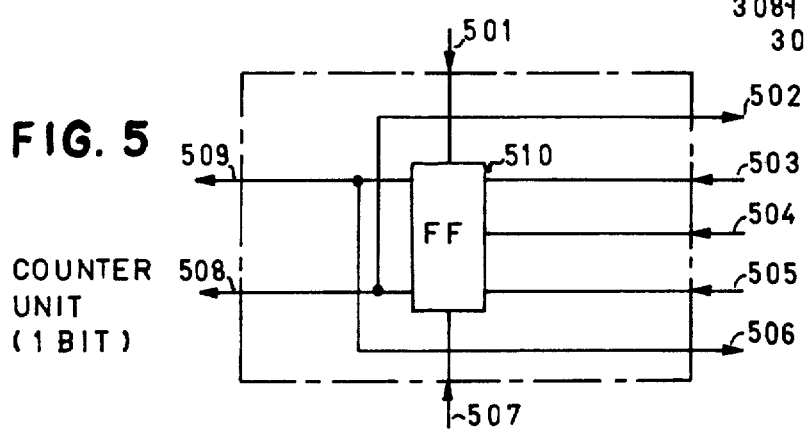
FIG. 5 is a circuit diagram of a counter unit for the case of one bit.

Reference is now made to FIG. 5 which shows the implementation of the counter unit of FIG. 4 for just one bit. Leads 501 through 509 have the same effect as leads 401 through 409 respectively. Only one master-slave flip-flop 510 is required, and cycling modulo 2 does, therefore, not occur even if not externally inhibited. Such a counter unit is not suitable for the function value units (unless only setting, read-out, and use are required), but it is the preferred embodiment of the counter unit in the heuristic responsibility unit of "global-search" type (see FIG. 7), particularly when simplest hardware is required.

Figure 6:
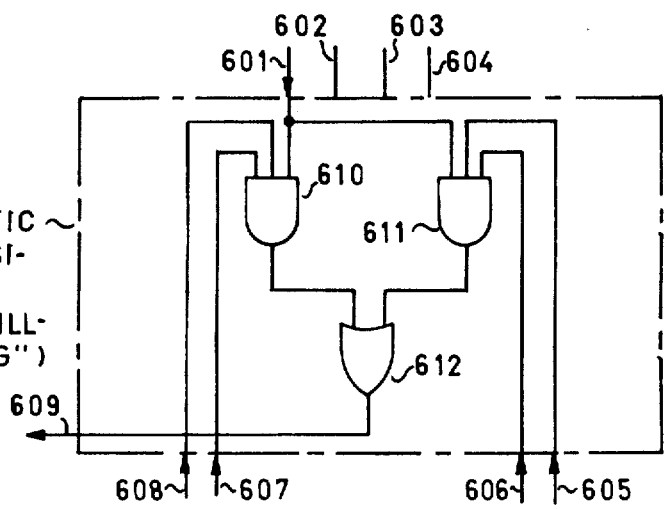
FIG. 6 is a circuit diagram of a heuristic responsibility unit of "hill-climbing" type.

Reference is now made to FIG. 6 which shows one heuristic responsibility unit (219 or 220 of FIG. 2) of the "hill-climbing" type. This type is the simplest of the three types presented in these specifications both from a conceptual and from a hardware point of view. In the interest of giving a clear explanation of the other types it is described first. It must be pointed out that experimental evidence indicates the other two types to be in general far superior, however the "hill-climbing" unit is useful for modifying an approximate synthesis found by other means in order to seek a local maximum of the probability of correct response of the network. The latter situation is characterized by the impossibility of improvement occurring by a functional change of any single element alone.

Lead 601 carries the heuristic responsibility input signal from lead 201 of the element; lead 602 carries the desired network output value from lead 226; lead 603 carries its complement; and lead 604 carries the clock signal; however, the last three signals are not used in the "hill-climbing" type of unit. Lead 609 is the output which is transmitted on lead 203 in the case of the left heuristic responsibility unit 219 and on lead 205 in the case of right heuristic responsibility unit 220. The input on the opposite side (on the right side, on lead 204, or the left side, on lead 202, respectively) is placed on lead 605 and its complement on lead 608. Leads 606 and 607 from the function value units communicate to both heuristic responsibility units the function AND, OR, LEFT or RIGHT currently realized by the element.

The left heuristic responsibility output on lead 203 is equal to ONE if and only if (a) the element is heuristically responsible and (b) the inversion of the left input signal on lead 202 would change the value of the element's output on lead 200, given the current function realized by the element and the current value of the right input signal on lead 204. For example, if the function realized is OR, then a change of the left input would change the element's output if and only if the right input is ZERO. If the function is AND, then a change in the left input would change the element's output if and only if the right input in ONE. Change would always occur for a LEFT function, but never for a RIGHT function. If lead 201 carries a ZERO, indicating that the element in question is not heuristically responsible, then the indication of a potential change in output is overriden by a ZERO on lead 203. Thus during training, when a ONE is placed on the heuristic responsibility input of the output element of the network by lead 101, lead 203 is set to ONE if and only if inversion of the signal on its companion input lead 202 would change the network output. The right heuristic responsibility unit operates in a similar way.

The specific way in which this is implemented in the preferred embodiment of this unit will now be described for the left heuristic responsibility unit 219. The right heuristic responsibility unit 220 operates in a like manner and will not be discussed in detail. Leads 601, 608, and 607 are the inputs to AND-gate 610; leads 601, 605, and 606 are the inputs to AND-gate 611. The outputs of these two AND-gates are the inputs to OR-gate 612 whose output appears on lead 609. Lead 606 carries the signal on lead 217 which is the complement of the signal on lead 216, the latter being the output of the element on lead 200 when the input pair on leads 202 and 204 is (ZERO,ONE). The output on lead 200 is ONE if the input pair is (ONE,ONE). Hence if the right input is ONE, the left input influences the output on lead 200 if and only if lead 216 carries a ZERO, i.e. if lead 217 and lead 606 are ONE. This case of influence is thus characterized by ONE signals on the leads 605 and 606. The third input from lead 601 to AND-gate 611 implements inhibition by a ZERO on the heuristic responsibility input lead. In a similar manner, if lead 204 carries a ZERO, lead 608 carries a ONE. The (ZERO, ZERO) input pair gives a ZERO output on lead 200 so that the left input influences the element's output if and only if the output under the (ONE,ZERO) pair, as indicated by the signal on lead 607 from lead 213, is ONE. This case of influence is detected by ONEs on leads 607 and 608. The heuristic responsibility signal on lead 601 is the third input to AND-gate 610 which inhibits it when the element is not heuristically responsible. Thus, as stated above, a ONE is placed on lead 609 and hence on lead 203 of a certain element for a given *n*-tuple presented to the network by the control unit during training precisely if inversion only of the signal on lead 202 of said element (say by insertion of an inverter) would cause a change in the network output.

Figure 9:
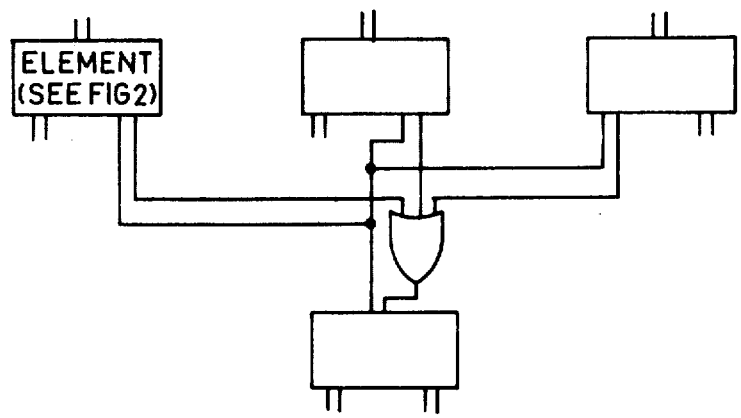
FIG. 9 shows how elements may be interconnected to form networks which are not trees.

The proof of the foregoing statement for a tree-like network as in FIG. 1 is simple. The statement holds, though, for any loop-free network wherein the output of an element may be used at input leads of several other elements, provided the heuristic responsibility input of such an element is computed using the OR-function of the heuristic responsibility leads associated with said input leads of other elements as illustrated in FIG. 9. We say a network is "generally tree-like" if there are relatively few instances of such multiple interconnections.

It can now be understood why the term "hill-climbing" is applied to this type of unit. The set of *n*-tuples for which a given element is heuristically responsible according to "hill-climbing" is precisely the set for which the element output is responsible for the network output. The element and network output are also equal for these n-tuples due to the increasing nature of the functions AND, OR, LEFT, and RIGHT. The element can use this direct relationship between its output and the network output by further distinguishing *n*-tuples for which it is heuristically responsible according to the inputs on its leads 202 and 204 resulting from presentation of the *n*-tuple to the network. Thus, for *n*-tuples for which it is heuristically responsible and for which the input pair is (ONE,ZERO) or (ZERO,ONE) the counters of the associated function value units 215 and 218 can count up for ONEs and down for ZEROs of desired network output (except at the counter limits); and thereby determine statistically an estimate of the better choice, ONE or ZERO, for the network output, and hence for the element output, under these respective input pairs. These choices are likely to cause an increase in the probability of correct response during training.

Of course the choices are made on a statistical basis only, by sampling the sequence of n-tuples presented to the network during training, so that this is only an approximation of a true "hill-climbing" procedure. The approximation would be improved by increasing the range of the counters in the function value units, and a further improvement would possibly be obtained by additional hardware to set all counters to 0 or MAX without changing any of their most significant bits whenever any functional change has occurred anywhere in the network.

As mentioned above, networks of "hill-climbing" elements usually fail to give satisfactory syntheses when training is started from a random assignment of states to the elements. One reason for this is because the synthesis problem is inherently "multi-modal" in nature. In fact, there are usually many different syntheses of the same function within a given network if there are any at all. And even if there is one synthesis only, it can be shown that "hill-climbing" will not always find it, and may instead get stuck at some unsatisfactory local maximum of the probability of correct response. Due to the above difficulties, the "hill-climbing" unit seems useful only for "fine tuning" of a synthesis; however, it is essential to understand it conceptually as a basis for the other types of heuristic responsibility unit.

The two types of heuristic responsibility unit about to be described replace the dependency of heuristic responsibility (via leads 606 and 607) on the function currently realized in the element by a statistical computation using instead the desired network output on lead 602, its complement on lead 603, and the clock signal on lead 604. This is an essential idea of the present invention. Computer simulation has shown that satisfactory syntheses can very often be obtained by this means when "hill-climbing" makes little if any progress. A further justification of this replacement in the case of the "global-search" type unit is a conjectured generalized form of convergence theorem, stating that a synthesis will be found (using counters of sufficient range) in all cases where a synthesis exists and where the inputs to the network from the variable connections unit are stochastically independent. Even when the hypotheses of the theorem are not satisfied, the associated algorithm functions extremely well as a global search heuristic. The essential advantage of the above replacement is that a subtree providing signals to the left input lead 202, say, can be caused to adapt in such a way that the already synthesized function on the right input lead can be effectively combined with it, even if a change of the function currently realized by the element must occur. The hill-climbing unit is disadvantageous in this regard, since the function currently realized is "assumed" to be the correct one. For example, if it is RIGHT, then a subtree providing the left input on lead 202 will never change state, so it cannot improve and consequently cause a functional change in the element.

Figure 7:
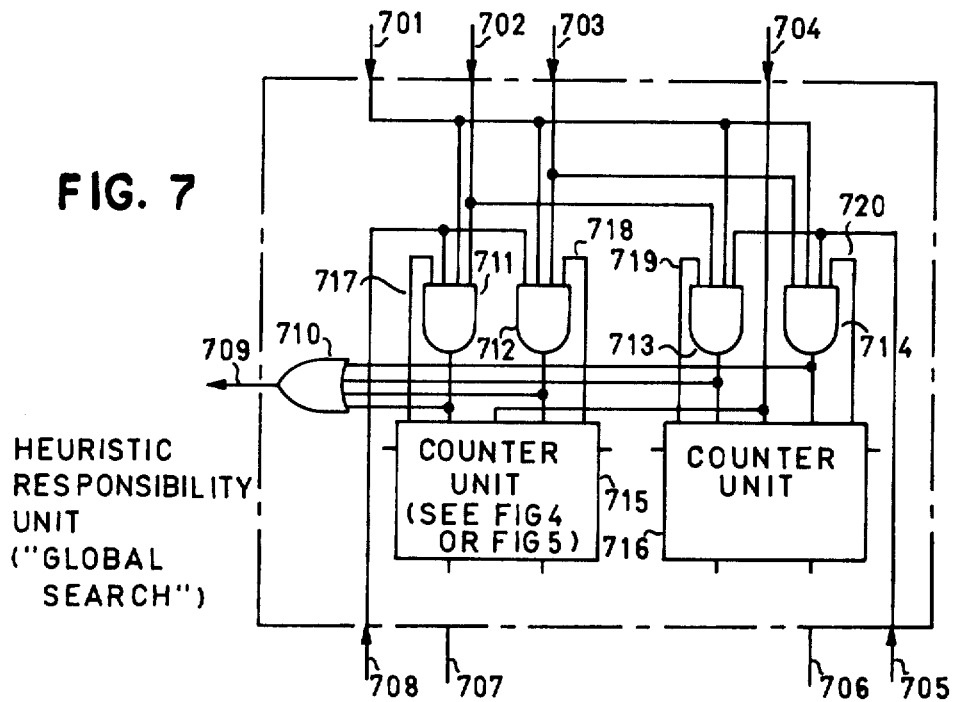
FIG. 7 is a circuit diagram of a heuristic responsibility unit of "global search" type.

Reference is now made to FIG. 7 which is a circuit diagram of one heuristic responsibility unit of FIG. 2. This unit is of the "global-search" type. Lead 701 carries the heuristic responsibility input signal from lead 201; lead 702 carries the desired network output signal from leads 226 and 126; lead 703 carries its complement from lead 227; and lead 704 carries the clock signal from leads 225 and 125. For computation of the left heuristic responsibility signal on lead 203 of the element, the right input signal on lead 204 is placed on lead 705 and its complement on lead 708. If the right heuristic responsibility on lead 205 is to be computed, the left input of the element on lead 202 is placed on lead 705 and its complement on lead 708. Leads 706 and 707 from the function value units are not used for this type of heuristic responsibility unit.

It will be sufficient to discuss the case of left heuristic responsibility, where lead 709 is the output on lead 203. We note first that the PRESET and CLEAR inputs 401 and 407 of the counter units 715 and 716 are connected to a source of logic ONE since they are not used here. The most significant bits of the counters and their complements are also not used. The output of the unit on lead 709 is the output of OR-gate 710 whose inputs are the signals on the up-count and down-count inputs 403 and 405 of both counter units. These are computed by AND-gates 711, 712, 713, and 714, all with four inputs. The heuristic responsibility input on lead 701 is one input to all of these AND-gates, hence no change of state of the unit can occur at a clock pulse if lead 701 carries a ZERO; the output on lead 709 is then also ZERO. If the right input signal on lead 204 is ONE, lead 705 carries a ONE and lead 708 a ZERO. The latter results in the AND-gates 711 and 712 having ZERO outputs and therefore counter unit 715 cannot change state when a clock pulse arrives. Thus it is the counter unit 716 alone whose state determines left heuristic responsibility on lead 203 when the right input, on lead 204, is ONE. In these circumstances, the value of counter unit 716 is increased by unity at the clock pulse if the desired network output is ONE and if the value is not at maximum. In the same circumstances, the value of counter unit 716 is decreased by unity at the clock pulse if the desired network output is ZERO and if the value of counter unit 716 is not at 0. The OR-gate 710 gets a ONE input on one of its leads if and only if any count is enabled to occur at the clock pulse. Counter unit 716 has therefore the effect of approximately equalizing the numbers of ZEROs and ONEs of desired network output values for which lead 203 carries a ONE, under the condition that the element is heuristically responsible, i.e. that there is a ONE on lead 201, and that lead 204 carries a ONE. Counter unit 715 performs this task of approximate equalization when the right input on lead 204 is ZERO.

The preferred embodiment of this unit uses the counter unit of FIG. 5 with values 0 and 1 only. In this case "approximate equalization" means strict alternation of ZEROs and ONEs of desired network output values for which a ONE is placed on lead 203 in case the element is heuristically responsible and the right input on lead 204 is ZERO; and similarly for the right input lead value ONE.

An explanation of the operation of a network of "global-search" elements, i.e. elements using this type of heuristic responsibility unit, will now be given in a special case. It is supposed that the network is in the form of a tree as in FIG. 1, but not necessarily balanced, that the variable connections unit establishes a one-to-one connection as in the special case of pattern 0 defined above, that there exists some (unknown) assignment of functions AND, OR, LEFT, RIGHT to elements of the tree such that their composition realizes the specified function $f$ of $n$ variables, and that the a priori probability distribution P governing the random presentation of $n$-tuples during training is such that the components of the $n$-tuple are stochastically independent.

The proof that a synthesis will occur proceeds by recursion from the elements of the tree with both inputs connected through the variable connections unit. In fact, it is sufficient to show that a correct assignment will be obtained for any one such element. For then the output signal of that element can be looked upon as one input to a reduced network, smaller than the given one by that one element, with a reduced function to be synthesized and a reduced a priori distribution. The reduced system satisfies all hypotheses on the original network, function, and a priori distribution. Thus the synthesis can proceed recursively towards the root of the tree. To simplify the explanation of why the assignment to an element nearest the variable connection unit will be correct, we suppose that all elements in the final, desired synthesis are responsible (i.e. according to the definition of actually changing the network output if their output is inverted) for at least some $n$-tuple of positive probability of occurrence.

Then the operation of the network to make the assignment to any chosen element having both inputs coming from the variable connections unit can be understood by making a table (a "decomposition chart" of $f$ according to H. A. Curtis: A new approach to the design of switching circuits. D. Van Nostrand Inc., Princeton, 1962), having four lines corresponding to the input pairs (ZERO,ZERO), (ZERO,ONE), (ONE,ZERO), and (ONE,ONE) to the chosen element, and having $2^{n-2}$ columns, each one corresponding to an $(n-2)$-tuple of the other network inputs from the variable connections unit. According to hypothesis, P gives a product distribution on these axes. Now heuristic responsibility according to "global search" changes P to a distribution P' which is P conditional upon the chosen element being heuristically responsible.

In order to determine properties of P', the relationship between "global search" heuristic responsibility and responsibility at a correct synthesis must be discussed.

There are certain columns of the four line table which are constant. For these columns the element is not responsible. For the other columns the element is responsible and the value of $f$ depends in exactly one way on the inputs to the element. This can be seen for example of the assignment element 1=AND, element 2=OR, element 3=LEFT and the uniform distribution P of 1/16 on all 4-tuples in the case of the network of FIG. 1. The chosen element is no. 2 with input leads 106 and 108. The four-line decomposition chart is shown in table I.

TABLE I

| input on (106, 108) | input on (110, 112) | | | |
|---|---|---|---|---|
| | (ZERO,ZERO) | (ZERO,ONE) | (ONE,ZERO) | (ONE,ONE) |
| (ZERO,ZERO) | ZERO | ZERO | ZERO | ZERO |
| (ZERO,ONE) | ZERO | ZERO | ONE | ONE |
| (ONE,ZERO) | ZERO | ZERO | ONE | ONE |
| (ONE,ONE) | ZERO | ZERO | ONE | ONE |

The OR-function required of the chosen element can be observed in each of the two right-hand columns, for each $n$-tuple of which element no. 2 is responsible. Unfortunately, no means is known for determining when the chosen element should be responsible except after a synthesis has been found, so some other method must be used to eliminate the effect of the two constant columns at the left. This is achieved by using "global search" heuristic responsibility as determined by the elements above the chosen element in the network.

First we shall explain the simple method of doing this used in the paper: W. W. Armstrong, G. V. Bochmann: A convergence theorem for logical network adaptation. Publ. No. 95, Département d'Informatique, Université de Montréal, 1972. In effect the ZERO and ONE values in the four-line chart are caused to have equal probability. The probability of ZERO originally is 10/16 while the ONE has probability 6/16. Hence to equalize, all probabilities of ZERO entries in Table I are multiplied by 4/5 and all probabilities of ONE entries are multiplied by 4/3. The corresponding table of probabilities now is as in TABLE II.

TABLE II

| input on (106, 108) | input on (110, 112) | | | |
|---|---|---|---|---|
| | (ZERO,ZERO) | (ZERO,ONE) | (ONE,ZERO) | (ONE,ONE) |
| (ZERO,ZERO) | 1/20 | 1/20 | 1/20 | 1/20 |
| (ZERO,ONE) | 1/20 | 1/20 | 1/12 | 1/12 |
| (ONE,ZERO) | 1/20 | 1/20 | 1/12 | 1/12 |
| (ONE,ONE) | 1/20 | 1/20 | 1/12 | 1/12 |

The probability of ONEs is now compared to the probability of ZEROs in each line. ONEs are less probable than ZEROs (0 < 4/20) in line (ZERO,ZERO) and more probable (2/12 > 2/20) in the other lines. This test enables determination of the OR-function which should be realized by element no. 2 as shown by the nonconstant columns of TABLE I.

The above method if implemented in hardware would not be satisfactory for practical applications since there may be very many columns only a few of which are nonconstant. The comparison of the probabilities of ONEs and ZEROs in each line would be impossible to compute reliably unless very large counter ranges are used in the function value units corresponding to the (ZERO,ONE) and (ONE,ZERO) lines. Heuristic responsibility according to "global search" has the effect of weighting the probabilities in such a way that the P'-probabilities of ONEs and ZEROs are still equalized over-all, and also in such a way that the P'-probability of all entries in a constant column are the probabilities according to P multiplied by the same factor. This is due to the dependence of the left (or resp. right) heuristic responsibility output only on the right (or resp. left) input, on the desired network output, and on some data in memory, in any element. More specifically, the computation of whether a chosen element is heuristically responsible or not is done by the elements above it on a path to the root of the tree. At each one, the input lead not on this path is the one used to compute heuristic responsibility. By assumption, the input values on those leads are stochastically independent of the inputs to the chosen element, so at least in constant columns the factor to be applied to the P-probability is the same for all four lines. Thus the relative probabilities of ONEs and ZEROs according to P' is the same in the constant columns of all four lines. For the nonconstant columns, the desired network output intervenes in the computation, but it can only increase the relative probability of ONEs in lines where the nonconstant columns contain ONEs, and decrease it in the other lines. In fact there are only two values for the ratio of the probabilities of ONEs and ZEROs for the four lines. Since the over-all probabilities of ONEs and ZEROs are set to be equal (more precisely, approximately equal) by the two counters in each heuristic responsibility unit, one of the ratios is greater than unity and the other less than unity. This comparison tests whether the (ZERO,ONE) and (ONE,ZERO) lines contain ONEs or ZEROs, respectively, in the nonconstant columns. It is also a computation which can be, and indeed is in effect, carried out by the counters in the two function value units.

For a complete proof that global search leads to a correct synthesis under the assumption that one exists and that the components of n-tuples are independent under P several complications must be considered:

a. the fact that some elements are never responsible, b. the fact that the assignment is based on a statistical estimate which may, if rarely, become temporarily incorrect, and c. the fact that the heuristic responsibility computation also depends on the current function assignment to some elements and on the counter values in the heuristic responsibility units.

These details are quite troublesome, but (a) is dealt with in W. W. Armstrong, G. V. Bochmann: A convergence theorem for logical network adaptation. Publ. No. 95, Département d'Informatique, Université de Montréal, 1972, (b) can be overcome by considering large enough counter ranges in the function value units, and (c) means computing P' as a mixture of probabilities depending on assignments and counter values, but in such a way that no component probability tends to push the assignment to the chosen element away from the correct function.

A significant advantage of "global search" over the system described in the above reference becomes apparent when the heuristic responsibility computation is considered for an assignment which is a synthesis of a function in complete conformity with all training specifications. It can be shown that the set of n-tuples for which an element is heuristically responsible with nonzero probability is a subset of the set for which it is responsible (i.e. heuristically responsible under "hill-climbing") according to that synthesis (except for some details involving constant functions and counter ranges in the heuristic responsibility units). This means that once a synthesis has been attained and has persisted long enough for certain counters to reach a limit, the synthesis is stable: no more functional changes occur.

For example, if an element realizes an OR-function, then the left heuristic responsibility output is ONE only if the right input is ZERO; but even then not always, only in such a way as to approximately equalize ZEROs and ONEs of desired network output when the element is heuristically responsible. The left heuristic responsibility output is never ONE for a ONE input on the right after the counter associated with that signal, counter unit 716 in FIG. 7, has reached its maximum value.

The above argument holds whether the hypotheses of the convergence theorem hold or not. Another advantageous property which holds in general is that if a certain element realizes a RIGHT gate (a similar consideration holds for a LEFT gate), then if the desired network output signal occasionally differs from the right input signal when the element is heuristically responsible and the latter signal is ZERO, but never when it is ONE, then the left heuristic responsibility output lead will (eventually) carry a ONE only for ZERO values of said right input signal. This tends to cause the subnetwork supplying the left input to be trained to produce a function which, together with an OR-operation in the given element, would completely correct the "errors" on the right input. An analogous property holds when the roles of ONE and ZERO, and OR and AND are reversed.

17

Figure 10:
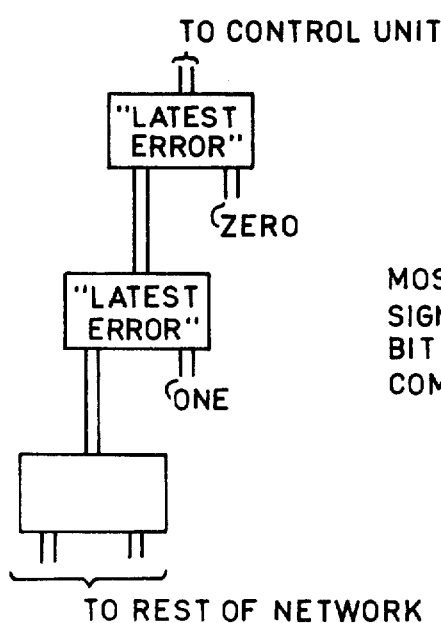
FIG. 10 shows how two elements of "latest error" type may be used to promote synthesis of constant ZERO or constant ONE functions in "global search" type networks.

A word of caution is in order in respect to "global-search" type networks. They cannot be guaranteed to synthesize the constant ZERO or constant ONE functions as a result of training. These are the two cases where the ZEROs and ONEs of the desired network output cannot possibly be equalized, and even though the range of values of counters in the heuristic responsibility units allows state changes to continue for some time, eventually all changes cease, perhaps before the constant function has been synthesized. This problem can be taken care of in the control unit by checking to determine if indeed the specified function values are constant, and if so, not using the network. Another way of solving this problem is by inserting two extra elements of the "latest-error" type between the root of the "global-search" type network and the control unit as in FIG. 10. The two unused input leads are connected to sources of constant ZERO and constant ONE. The same effect can be obtained by using three "global-search" type elements as in FIG. 10 except that the heuristic responsibility signals of all three are taken directly from lead 101 of the control unit instead of via the cascade of elements. The elements other than the top two are interconnected as before.

Figure 8:
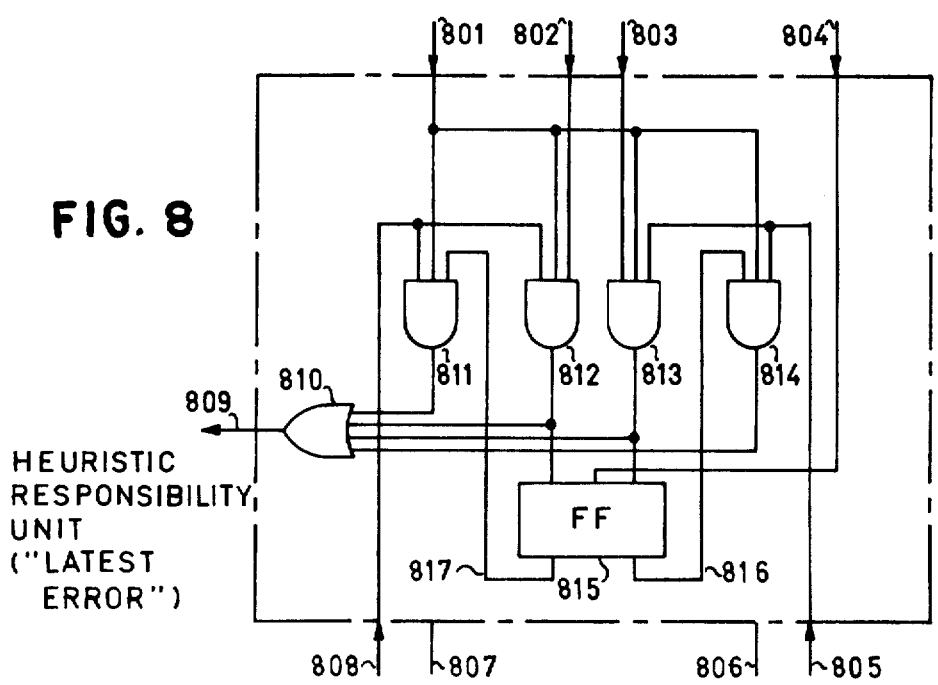
FIG. 8 is a circuit diagram of a heuristic responsibility unit of "latest error" type.

Reference is now made to FIG. 8 which shows one heuristic responsibility unit of "latest-error" type. Lead 801 is the heuristic responsibility input from lead 201; lead 802 carries the desired network output from leads 226 and 126; lead 803 is the complement of the latter from lead 227; lead 804 carries the clock signal from leads 225 and 125. The output is on lead 809 which becomes lead 203 for left heuristic responsibility unit 219 and becomes lead 205 for the right heuristic responsibility unit 220. The input from the opposite side, on lead 204 or 202 respectively is placed on lead 805, and lead 808 carries its complement. Leads 806 and 807 from the function value units are not used here.

Whether unit 219 or 220 is considered, an "error" of the type of the input signal, on lead 805, is said to occur if (a) the element is heuristically responsible, i.e. there is a ONE on lead 801, and (b) the signal on lead 805 is different in value from the desired network output on lead 802. Thus AND-gate 813 with inputs from leads 801, 803, and 805 signals an error of type ONE by giving a ONE output. AND-gate 812 with inputs from leads 801, 802, and 808 signals an error of type ZERO by giving a ONE output. Since leads 805 and 808 are complementary only one of the outputs of AND-gates 812 and 813 can be ONE for any $n$-tuple presented to the network during training. At a clock pulse on lead 804 the output of the master-slave flip-flop 815 on lead 816 becomes equal to the type of the error if there was an error, or remains unchanged otherwise. Lead 816 therefore carries the type of the "latest previous error", i.e. previous to the currently presented $n$-tuple. Lead 817 carries its complement.

AND-gate 814 with inputs from leads 801, 805, and 816 signals by a ONE output that the present element is heuristically responsible and that the signal on lead 805 and the type of the latest previous error are both ONE. AND-gate 811 with inputs from leads 801, 808, and 817 signals by a ONE output that the present element is heuristically responsible and that the signal on lead 805 and the type of the latest previous error are both ZERO. Let the phrase "latest error" refer to an error in the above sense for the present $n$-tuple input to the network if one occurs, and to the "latest previous error" otherwise. Thus one can say that the output of the unit, computed by OR-gate 810 with input signals from the four AND-gates 811, 812, 183, and 814, is ONE if and only if the signal on lead 805 is of the same type as the latest error. This fact shows the origin of the name of this type of unit.

The "latest-error" type network does not have as nice a theory as the "global search" type; nor, as has been suggested by computer simulation experiments, does its performance reach the level of the latter type, however it does possess some advantages; it can learn constant functions, its heuristic responsibility at a synthesis is related to responsibility even more closely than that of "global search" is, and finally its hardward is somewhat less complex. Details will not be discussed herein.

There are many combinations possible of the ideas embodied in the three species of heuristic responsibility unit described. For example, the lead 203 can be made equal to ONE if and only if there is an error (as defined above) on lead 204 for the current input $n$-tuple or if a "global search" unit would produce a ONE output on lead 203, and similarly for lead 205. Furthermore, dependencies of heuristic responsibility on several previous error types, not just the latest previous error type, can be defined. It would be possible to make far more elaborate statistical analyses within each element or in the control unit, or both, and thereby adjust performance by switching from one species of heuristic responsibility to another at appropriate times during training without reading information out of one species of network and into another. On this basis, it is clear that heuristic responsibility is a generic invention.

An explanation of the operation of the present invention during the training period will now be given, making reference to FIG. 1 first. A task is made known to the control unit in the form of a number $n$ (of variables) and a set of $n$-tuples of logical values, each associated with an a priori probability and with a logical value which indicates the desired network response to the given $n$-tuple. This set of $n$-tuples will be called the training set. The control unit selects by means of lead 122 a connection pattern from among those available for the given value of $n$. For example, if $n$ is equal to three, it might select the pattern 1: 106 is connected to 114, 108 to 116, 110 to 118 and 112 to the output of an inverter whose input is connected to lead 114.

The initial state of all flip-flops in the network is completely arbitrary in general, although a setting operation may have been done if the present training period represents a continuation of a previous one, where the same assignment of logical operations to the elements is restored. During the entire training period the setting leads 123 and 124 carry ZERO signals and lead 101 carries a ONE. A sequence of $n$-tuples $S_i$ is now presented to the variable connections unit by the control unit, each one chosen randomly and independently from the training set according to the a priori distribution on $n$-tuples. As each member of the sequence is presented, the desired network output value is placed on lead 126 by the control unit. In general, each member of the training set will be presented several times during the course of training.

If $n=3$ the $n$-tuples are represented by simultaneous signals on leads 114, 116, and 118. The signal on lead 120 is irrelevant. The first vector presented is $S_1=(X_1,X_2,X_3)$. The variable connections unit transforms this to a vector $(Y_1,Y_2,Y_3,Y_4)$ on leads 106, 108, 110, and 112. For the given connection pattern the latter vector equals $(X_1, X_2, X_3, \bar{X}_1)$ where the bar denotes inversion. Elements 2 and 3 simultaneously process this vector to give outputs on leads 102 and 104. These outputs enter element no. 1 and it produces an output. The outputs of the elements depend only on their input signals on leads 202 and 204, and on the values of the most significant bits of the counters in the function value units 215 and 218. Then the control unit reads the output signal of the network on lead 100.

Before a clock pulse occurs, the following operations must take place: The function value units of element no. 1 both calculate the values of the input signals to their counter units to determine if an up- or down-count will occur at the next clock pulse. Simultaneously with the above, the heuristic responsibility signals on leads 103 and 105 are computed by element no. 1. Once these are computed elements nos. 2 and 3 are in a position to simultaneously perform the same operations as above element no. 1, except that their heuristic responsibility outputs are not used by the control unit in the present specification.

It should be noted that once the control unit has placed signals on leads 114, 116, 118, 123, 124, 126, and 101 all operations are purely combinational logic. No timing difficulties arise, since only the time required for all signals to attain their final stable values is important. Once this has occurred, the next clock pulse may be given on line 125, which changes the states of the elements as determined by the values on all flip-flop input leads at the beginning of the pulse.

After the pulse, the process above is repeated with a vector $S_2$, and so on for $S_3, S_4 \ldots$ until a termination criterion is satisfied. It is important for the functioning of the present embodiment of the invention that the $S_i$ be chosen randomly and independently from the training set by the control unit. be to The control unit must have some criterion as to when training is to be terminated. For example, after every 1000 S-vectors, say, it could run through all vectors in the training set and count the number of errors, that is, the number of times a difference between actual and desired network outputs occurs. As long as a ZERO signal is placed on leads 101, 123, and 124 during this evaluation, the state of the network is not changed. If the number of errors is sufficiently small, training would be stopped. Another possible termination criterion would to have a sufficiently small number of errors in the last block of, say, 1000 S-vectors presented during training. This method has the advantage of not interrupting training.

In some cases, the network may be too small to satisfy the training termination conditions specified, and it would be highly desirable to have a means of detecting this so that the network could be replaced by a larger one.

After training is terminated lead 101 is placed in a ZERO condition and the logical operations realized by the elements are fixed. A period of use may begin. Then any $n$-tuple S, whether in the training set or not, can be presented to the network by the control unit (via the variable connections unit using the same pattern of connections, of course). The clock pulse may be suppressed and the frequency with which S-vectors can be presented depends only on the delay for output lead 100 to stabilize after each presentation.

In order to accelerate operation of the network it may be desirable to replace the present gates 206, 207, 209, 210, 211, and 212 by a circuit for calculating the output of an element simultaneously with its complement. Thus the complementary inputs of leads 102 and 104 would be available from elements 2 and 3 and would not have to be computed by gates 206 and 207 of element no. 1. Four inverters would be required at the inputs to elements 2 and 3 for the signals on leads 106, 108, 110, and 112 in this example.

A method will now be described for setting the counters of all function value units to one of the values 0 or MAX in any prescribed manner in a tree-like network. This carried out for the tree of FIG. 1 where the counters are to be set so that element no. 2 is an AND-state, element no. 3 is a RIGHT-state, and element no. 1 in an OR-state. The first step is for the control unit to call upon the one-to-one connection pattern 0, which connects lead 106 to 114, 108 to 116, 110 to 118, and 112 to 120.

The method is based on two facts about the operation of the elements. First, a (ZERO,ZERO) input always gives rise to a ZERO Output, and a (ONE,ONE) input always gives rise to a ONE output. Hence the input of any one element in any tree can be caused to be any one of the four possible combinations by an appropriate input applied on leads 114, 116, 118, and 120 by the control unit. For example, in FIG. 1 element no. 1 can be given a (ZERO,ONE) input if a ZERO is placed on leads 114 and 116 and a ONE leads 118 and 120. In general, if one input lead of any element is to have a ONE (or resp. a ZERO), independently of all counter values in the network, then the subtree of elements below the aforementioned input lead should receive all ONE (or resp. ZERO) inputs from the variable connections unit. More generally, if the elements of the given tree are classified into layers by their distance from element no. 1 as measured in terms of the number of intervening elements, then all the elements of a layer can be given arbitrarily specified inputs simultaneously by the above procedure.

The second fact, important for setting counters, is that the counters are not enabled to change values under a command on leads 123 and 124 if the input to the element is (ZERO,ZERO) or (ONE,ONE). This means that while any input pattern is being presented to the elements of a given layer, all elements below that layer cannot be influenced by commands on leads 123 and 124. Thus the method involves first setting the counters of the lowest layer, than the next lowest, and so on up to the top layer, consisting only of element no. 1. The setting of the counters of each layer involves four steps. First all elements of that layer are given (ZERO,ONE) inputs and the lead 123 is temporarily raised to a ONE. This we shall refer to as a "CLEAR" command. Then all elements of that layer are given (ONE,ZERO) inputs and a "CLEAR" command is given. Thus all counters in the layer are set to 0 while no counter of lower layers is changed. Now all elements of the chosen layer whose (ZERO,ONE) counter (in unit .218 of FIG. 2) is to be set to MAX are given (ZERO,ONE) inputs while all others are given (ZERO,ZERO) inputs. Then lead 124 is temporarily raised to ONE. We shall refer to this as a "PRESET" command. Now all (ZERO,ONE) counters of the layer have their correct values. Next all elements of the layer whose (ONE,ZERO) counter is to be set to MAX are given (ONE,ZERO) inputs while the rest of the elements are given (ZERO,ZERO) inputs, and a "PRESET" command is given. This completes the setting of all counters of the layer each to 0 or MAX as prescribed. The next higher layer may now be set, and so on until all counters have been set as prescribed. The advantage of the above setting method is that the elements do not have to be separately addressed, nor set by individual wires to each. The time of two CLEAR and two PRESET commands multiplied by the number of layers should normally be relatively short compared to the time the network will be used or trained in order for this method to be acceptable.

In the particular example given above the setting sequence is given by TABLE II.

TABLE III

| lead 114 | lead 116 | lead 118 | lead 120 | command |
|---|---|---|---|---|
| ZERO | ONE | ZERO | ONE | CLEAR |
| ONE | ZERO | ONE | ZERO | CLEAR |
| ZERO | ZERO | ONE | ONE | PRESET |
| ZERO | ZERO | ZERO | ZERO | PRESET |
| ZERO | ZERO | ONE | ONE | CLEAR |
| ONE | ONE | ZERO | ZERO | CLEAR |
| ZERO | ZERO | ONE | ONE | PRESET |
| ONE | ONE | ZERO | ZERO | PRESET |

This sets element 1 to OR, 2 to AND, and 3 to RIGHT. Several of the steps could be left out in this case.

A method will now be described for reading out the logical operations realized by all elements. This proceeds element by element from the top layer downward in the tree. The read-out is destructive in that while each layer is being read out, elements in that layer are set to OR by giving PRESET commands. This does not modify the counters in the function value units of any other layers, and in particular all higher layers contain only OR-gates.

Suppose a new layer is to be read out, and all elements in layers above it, if any, are OR-gates. Then the leftmost element of that layer is given a (ZERO,ONE) input while all others get (ZERO,ZERO) inputs. Thus the output of the network indicates the output of the chosen element for the (ZERO,ONE) input. A PRESET command is then given. The same procedure is repeated for the (ONE,ZERO) input. Thus, the function realized by the element as a gate is now known to the control unit and it has been set to OR. Now the next-to-leftmost element of the layer is read out, and so on for all elements of the layer. Then read-out continues to lower layers, if any.

The information read out includes only the logical operations of the elements, not the values of all counters and flip-flops. These gate values can be restored by the setting procedure already described. This read-out and setting entails a loss of information only in the case where training is to be continued after restoration. It is felt that this loss of information is adequately compensated for even in this case by the simplicity of the element structure required to realize read-out and setting, which consists essentially only of the two NAND-gates 311 and 314 of FIG. 3.

A method will now be described which has been used for training a network of 8191 elements of the "global search" type designed according to the present invention, but simulated on a digital computer, to classify digitized handwritten characters into two classes. The characters used in this example were 500 numerals from the Institute of Electrical and Electronic Engineers data base 1.2.3 (the Highleyman data). This data base in part contains 1000 numerals, half of which are very sloppily written and the other half of which are fairly well written but with occasional breaks in the strokes in the discretized version, particularly for the 8's. We used the latter 500 numerals for this experiment. Each character is described by a 12 × 12 matrix of bits and its correct type 0, 1 ... 9. Thus the control unit was set up to present to a variable connections unit inputs of $n=144$ logical signals. The variable connections unit used a connection pattern which was derived from a pseudo-random number generator and connected the 8192 input leads of the lowest layer of elements pseudo-randomly to the 144 signals from the controller and their 144 complements. A training set of 300 out of the 500 numerals was chosen. This contained 30 out of the 50 of each numeral 0, 1 ... 9 present in the original data set. A task was chosen such as classifying the 300 into 0 and non-0 types. Then an a priori probability distribution was placed on the training set which selected 0's with probability 1/2; and a sequence of $n$-tuple inputs to the network, chosen pseudo-randomly, according to the a priori distribution, was presented until no further improvement in the number of correct responses per 100 stimuli presented during training was obtained. The percentage of the training and test set characters correctly classified was then determined. This was done for each of the ten tasks of classifying into 0 versus non-0, 1 versus non-1, etc. The same connections were used for all tasks. The results are shown in TABLE IV.

TABLE IV

| task | % correct on training set | % correct on test set |
|---|---|---|
| 0 | 100.0 | 97.5 |
| 1 | 100.0 | 99.5 |
| 2 | 100.0 | 99.5 |
| 3 | 100.0 | 98.0 |
| 4 | 100.0 | 99.0 |
| 5 | 100.0 | 98.0 |
| 6 | 100.0 | 97.5 |
| 7 | 100.0 | 99.5 |
| 8 | 100.0 | 96.0 |
| 9 | 100.0 | 99.5 |

Extrapolation was demonstrated by the fact that the percentages of correct classifications of the test set characters, which were never presented during training, were very close to 100%. Improvement of the above percentages would require a larger training set, a longer training period, and perhaps a larger network.

Figure 11:
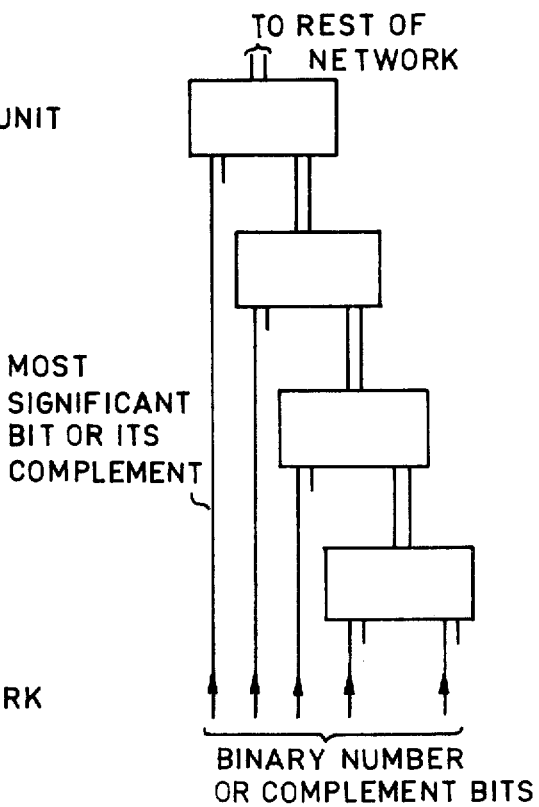
FIG. 11 shows how a "linear" network is used to synthesize boolean functions for comparing numerical quantities with a numerical threshold.

A method for using the present invention to classify numerically characterized individuals will now be described using as an example the data on 150 Iris plants as described in the paper by R. A. Fisher: The use of multiple measurements in taxonomic problems. Annals of Eugenics 7, 179–188, 1936. There were 50 plants of each of three species, each individual being characterized by four measurements: the length and width of the petals and sepals. Before application of the present invention, the measurements were coded into binary integers so that, for example, the most significant bit of a measurement was ZERO for about one half the total population, this bit and the next most significant bit together divided the population into four roughly equal parts, and so on. Enough bits were used to satisfactorily characterize the relative order of the original measurement values by the ordering of these integers. More precisely, each measurement was coded into a 5-bit integer. A tree-like network was then constructed (i.e. simulated on the computer) which consisted of 32 subtrees as in FIG. 11, each with four elements, representing the first measurement, 32 subtrees, as in FIG. 11 with those bits connected through inverters; and so on for the other three measurements for a total of 256 subtrees as in FIG. 11. The outputs of these subtrees were then connected to the inputs of a balanced tree of 255 elements, giving a tree of 1279 elements. A training set of 100 individuals was chosen. These were presented during a training period to the network using "global search" type elements. The partially specified boolean function of $n=4 \times 5=20$ variables to be synthesized was defined to be ONE for one of the species and ZERO for the two others. The network was trained until perfect discrimination on the training set was achieved. Then a different species was chosen and the same network was trained to synthesize a new discriminant function. Together the two discriminant functions could thus classify the individuals of the training set correctly into one of the three species. When these discriminants were subsequently applied during a period of use to the other 50 individuals never presented in training, there were only three misclassifications. This demonstrated the desired generalization via insensitive extrapolation from the training to the test set.

This method of classification has the advantage that the descriminant functions are not a priori constrained to a particular class, such as linear or quadratic discriminant functions, and yet they tend to be as insensitive as is compatible with the training set data.

While one specific embodiment of this invention has been illustrated and described, a generic invention, including three different species of heuristic responsibility units, it will be clear that variations of the details of construction which are specifically illustrated and described may be resorted to without departing from the true scope and spirit of this invention.

I claim:

1. A digital logic circuit, hereinafter referred to as an element, which is a basic building block of learning machines formed by interconnection of a plurality of said elements into a network, which network under the control of an agent hereinafter referred to as a control unit, during a training period can learn a boolean function of $n$ variables, the latter applied by said control unit through a scheme of multiple connections and connections with inversion to certain inputs of said network, the action of each said element in forming the relationship between the said n variables and the network output being to process information as a two-input, one-output combinational circuit the logical operation of which depends on the internal state of said element, which internal state may be altered by the control unit's applying a training procedure to said network; and which element comprises:

input-and-output means comprising a first input lead, hereinafter referred to as the left input lead, a second input lead, hereinafter referred to as the right input lead, and an output lead;
   control signal input means for receiving control signals, comprising a clock lead and a desired network output lead;
   heuristic responsibility input-and-output means comprising a heuristic responsibility input lead, a left heuristic responsibility ouput lead, and a right heuristic responsibility output lead;
   output computation means;
   a first function value unit means;
   a second function value unit means;
   a first heuristic responsibility unit means, hereinafter also referred to as the left heuristic responsibility unit means;
   a second heuristic responsibility unit means, hereinafter also referred to as the right heuristic responsibility unit means; and
   interconnection means for connecting the aforementioned means as hereinafter required comprising direct connections and connections through inverters; whereby
   said output computation means is a combinational circuit receiving signals from said left input lead, said right input lead, said first function value unit, and said second function value unit, and sending its output signal directly to said output lead via said interconnection means, the value of said output signal being equal to $xy + x\bar{y}v_{10} + \bar{x}yv_{01}$, where $x$ is the value on said left input lead, $y$ is the value on said right input lead, $v_{10}$ is the value of the output of said first function value unit means, and $v_{01}$ is the value of the output of said second function value unit means;
   and whereby said first and second function value unit means are connected via said interconnection means to said control signal input means;
   and whereby said first function value unit means can change its internal state, which determines its output, only when a clock pulse occurs on said clock lead while $x$ is ONE and $y$ is ZERO, and said second function value unit means can change its internal state, which determines its output, only when a clock pulse occurs on said clock lead while $x$ is ZERO and $y$ is ONE;
   and whereby the output of said first heuristic responsibility unit means is connected via said interconnection means directly to said left heuristic responsibility output lead, and the output of said second heuristic responsibility unit means is connected via said interconnection means directly to said right heuristic responsibility output lead;
   and whereby a change of state of said first and second function value unit means and said first and second heuristic responsibility unit means may occur only at the occurrence of a clock pulse on said clock lead while the value on said heuristic responsibility input lead is a certain fixed value indicating "heuristic responsibility" of said element for the current input $n$-tuple presented to the machine during training.

2. An element as in claim 1 wherein said control signal input means comprises in addition a PRESET lead and a CLEAR lead, and wherein said interconnection means includes direct connections from said PRESET and CLEAR leads to said first and second function value unit means;
   whereby the values of the signals on said PRESET and CLEAR leads are normally maintained at a fixed value (herein chosen to be ZERO) by the control unit, and the digital logic circuit then operates as in claim 1;
   and whereby in addition to the changes of internal state of said digital logic circuit and occurring only at clock pulses, the following changes occur when no clock pulse is being given by the control unit during periods of setting or readout of the logical operation realized by the digital logic circuits in a network:
   if a ONE signal is temporarily placed on said PRESET lead and a ZERO is maintained on said CLEAR lead, then if $x$ is ONE and $y$ is ZERO the internal state of said first function value unit means may change, and must remain or become such that $v_{10}$ becomes ONE, while if $x$ is ZERO and $y$ is ONE then the internal state of said second function value unit may change, and must remain or become such that $v_{01}$ becomes ONE; and when a ZERO is maintained on said PRESET lead while a ONE is temporarily placed on said CLEAR lead a corresponding change of state may occur whereby $v_{10}$ or $v_{01}$ becomes ZERO.

3. An element as in claim 1 wherein each function value unit means contains a counter means having consecutive integer values 0 . . . MAX, where MAX is one less than a positive integral power of two, say $2^b-1$, and wherein the output of the function value unit means is the value of the most significant bit of the binary counter value, and wherein a unit up-count (or resp. down-count) occurs at a clock pulse given during training if, at said clock pulse,
 a. the element is heuristically responsible,
 b. the input pair $(x,y)$ of the element enables said function value unit means to change its internal state,
 c. the value stored in the counter is not MAX (or resp. 0) and
 d. the value on the desired network output lead is ONE (or resp. ZERO).

4. An element as in claim 1 wherein said left (and resp. right) heuristic responsibility unit means is a combinational circuit means which places a signal indicating heuristic responsibility on its output lead if and only if such a signal occurs on said heuristic responsibility input lead and the current outputs of the said first and second function value unit means are such that, were the value on the said left (or resp. right) input lead altered while the value on the said right (or resp. left) input lead remained the same, the value on said output lead computed by said output computation means would be altered.

5. An element as in claim 1 wherein the said left (and resp. right) heuristic responsibility unit means contains two approximate equalization means, one responding to the ZERO and one to the ONE value on said right (or resp. left) input lead of the element, so that when each approximate equalization means responds, values indicating heuristic responsibility on the output lead of said heuristic responsibility unit means occur for approximately equal numbers of input signal pairs $(x,y)$ (separated by clock pulses during a period of training) for which each of the following two conditions (a) and (b) is satisfied:
 a. there is an indication of heuristic responsibility on the heuristic responsibility input lead of the element, and the value on the right (or resp. left) input lead is the one to which the approximate equalization means responds, and the value of the desired network output lead signal, specified by the control unit for the n-tuple currently presented in the training sequence, which causes said signal pair $(x,y)$ at the input leads to the element, is ZERO,
 b. the same conditions as in (a) hold except that the value of the desired network output lead signal is ONE.

6. An element as in claim 5 wherein the approximate equalization means each include an up-down counter and combinational circuit means such that counts are permitted to occur at clock pulses if there is an indication of heuristic responsibility on the heuristic responsibility input lead and the approximate equalization means is the one responding to the $x,y$ input, the count being one unit up if the up-down counter is not at its maximum value and the desired network output is ONE and one unit down if the up-down counter is not at 0 and the desired network output is ZERO, and wherein the heuristic responsibility unit output indicates heuristic responsibility if and only if a count up or down is enabled to occur in one of the approximate equalization means at the succeeding clock pulse during training.

7. An element as in claim 1 wherein the left (and resp. right) heuristic responsibility unit means gives an indication of heuristic responsibility as output if and only if there is an indication of heuristic responsibility on the heuristic responsibility input lead and the right (or resp. left) input lead has the same value as for the latest error occurring on that input lead, including an error for the present input, whereby an error is said to occur on an input lead for one of a sequence of inputs separated by clock pulses during training if
 a. the element is heuristically responsible, and
 b. the desired network output lead carries the complementary value to the signal on said input lead.

8. An element as in claim 7 wherein the left (and resp. right) heuristic responsibility unit means comprises one AND-gate of which the output is ONE if and only if the present right (or resp. left) input is ZERO and this represents an error (as defined in claim 7), one heuristically similarly means. AND-gate of which the output is ONE if and only if the present right (or resp. left) input is ONE and this represents an error, one master-slave flip-flop whose inputs are the outputs of the above AND-gates and whose output signal thus represents the value on the right (or resp. left) input lead at the latest previous error (i.e. not including the currently occurring input in the sequence separated by clock pulses during a period of training), one AND-gate which gives a ONE output if and only if the element is heurristically responsible and the value on the right (or resp. left) input lead now and at the latest previous error as stored in said flip-flop, was ONE, one AND-gate which operates similrly for the ZERO input on said input lead, giving a ONE output if and only if the element is heuristically responsible and the complement of the signal on the right (or resp. left) input lead and the complement of the value stored in said flip-flop are both ONE, and one four-input OR-gate with inputs from the outputs of said four AND-gates to compute the output of the heuristic responsibility unit means;

9. A network composed of elements as in claim 1 for use in synthesizing boolean functions of $n$ variables during a period of training, whereby each of the said right and left input leads of each element is connected either to the output lead of another element, or, through variable connections and connections with inversions under the control of a control unit, to one of $n$ logical signals from said control unit, there being in the $n$-input, one-output network so formed no closed paths around which signals may pass; and whereby the control signal input means of all elements receive signals from said control unit; and whereby the heuristic responsibility output lead on the same side, right or left, as a certain input lead is connected to the heuristic responsibility input lead of the element which originates the signal on said input lead, or, if more than one input lead obtains its signals from said point of origin, whereby the heuristic responsibility output leads associated with said input leads are connected as inputs to a combinational circuit whose output indicates heuristic responsibility if and only if at least one of said heuristic responsibility output leads indicates heuristic responsibility and whose output is connected to the heuristic responsibility input lead at said point of origin; and whereby the output lead of the element which supplies the network output signal and the heuristic responsibility input lead of said element are connected to the control unit.

10. A digital logic circuit, hereinafter referred to as an element, which is a basic building block of learning machines formed by interconnection of a plurality of said elements into a network, which network under the control of an agent hereinafter referred to as a control unit, during a training period can learn a boolean function of $n$ variables, the latter applied by said control unit through a scheme of multiple connections and connections with inversion to certain inputs of said network, the action of each said element in forming the relationship between the said $n$ variables and the network output being to process information as a two-input, one-output combinational circuit the logical operation of which depends on the internal state of said element, which internal state may be altered by the control unit's applying a training procedure to said network; and which element comprises:

input-and-output means for interconnection with other such elements or via direct or inverted connections for connection to said control unit, comprising a first input lead, hereinafter called the left input lead, a second input lead, hereinafter called the right input lead, and an output lead;

control signal input means to receive, during training, signals containing clock information for the digital circuits and information about the desired network output corresponding to an $n$-tuple applied to the network during training;

output computation means to compute one of a fixed class of boolean functions of two variables to be realized on said input-and-output means depending on the current state of the element; and adaptation means to store and cause to be altered during said training period the internal state of said element and to influence the changes of state of other elements in the network, and thereby cause to be altered during said training period the composite boolean function of $n$ variables computed by the network, which adaptation means includes heuristic responsibility input-and-output means comprising a first, or left, heuristic responsibility output lead, a second, or right, heuristic responsibility output lead, and a heuristic responsibility input lead, and heuristic responsibility output computation means which computes a logical signal on each of the two heuristic responsibility output leads for each $n$-tuple applied to said network during training, whereby the two heuristic responsibility output leads carry a signal indicating "not heuristically responsible" if such is the case for the current signal on the heuristic responsibility input lead for an input $n$-tuple, and whereby the change of said element's internal state corresponding to an input $n$-tuple during training depends on the signal on its heuristic responsibility input lead, and whereby, in said network, the heuristic responsibility input lead of each element derives its signal from the heuristic responsibility output lead of a further element to whose corresponding input lead the said element is connected via said output lead; or, if there are several such further elements in said network, then it derives its signal from a combination logic circuit acting on the heuristic responsibility output lead signals corresponding to input leads deriving their signals from the output lead of said element; or, if there is no such further element in said network, then it derives its heuristic responsibility input lead signal from said control unit.

* * * * *